United States Patent
Bharatia et al.

(10) Patent No.: US 8,554,182 B2
(45) Date of Patent: Oct. 8, 2013

(54) METHOD AND SYSTEM FOR MULTIMEDIA MESSAGE DELIVERY IN A COMMUNICATION SYSTEM

(75) Inventors: Jayshree Bharatia, Plano, TX (US); Marvin Bienn, Dallas, TX (US); Kuntal Chowdry, Plano, TX (US)

(73) Assignee: Microsoft Corporation, Redmond, WA (US)

( * ) Notice: Subject to any disclaimer, the term of this patent is extended or adjusted under 35 U.S.C. 154(b) by 192 days.

(21) Appl. No.: 13/118,008

(22) Filed: May 27, 2011

(65) Prior Publication Data

US 2011/0230167 A1    Sep. 22, 2011

Related U.S. Application Data

(63) Continuation of application No. 10/964,911, filed on Oct. 13, 2004, now Pat. No. 7,962,124.

(60) Provisional application No. 60/510,654, filed on Oct. 13, 2003.

(51) Int. Cl.
 *H04W 88/02* (2009.01)
(52) U.S. Cl.
 USPC .................................................. 455/412.1
(58) Field of Classification Search
 USPC .............. 455/412.1, 412.2; 709/229, 226, 709/206
 See application file for complete search history.

(56) References Cited

U.S. PATENT DOCUMENTS

| | | | |
|---|---|---|---|
| 8,412,846 B2 * | 4/2013 | Shao et al. | 709/245 |
| 2004/0039789 A1 | 2/2004 | Jackson et al. | |
| 2004/0121757 A1 | 6/2004 | Laumen et al. | |
| 2004/0249871 A1 * | 12/2004 | Bazoon | 707/206 |
| 2005/0033852 A1 * | 2/2005 | Tenhunen | 709/229 |
| 2005/0041648 A1 * | 2/2005 | Bharatia et al. | 370/352 |
| 2012/0191854 A1 * | 7/2012 | Bharatia et al. | 709/225 |
| 2013/0060879 A1 * | 3/2013 | Mostafa | 709/206 |

FOREIGN PATENT DOCUMENTS

WO    WO-03030475    4/2003

OTHER PUBLICATIONS

3G: Third Generation Partnership Project 2 "3GPP2;" MMS MM1 Stage 3 Using SIP; X.S0016-312-0 v1.0; Jun. 2004, 41 pages.
"Final Office Action", U.S. Appl. No. 10/964,911, Aug. 18, 2008, 12 pages.
"Final Office Action", U.S. Appl. No. 10/964,911, May 26, 2010, 19 pages.
"Final Office Action", U.S. Appl. No. 10/964,911, May 1, 2009, 20 pages.
"Non-Final Office Action", U.S. Appl. No. 10/964,911, Nov. 28, 2008, 14 pages.
"Non-Final Office Action", U.S. Appl. No. 10/964,911, Dec. 8, 2009, 16 pages.

(Continued)

*Primary Examiner* — Diane Mizrahi
(74) *Attorney, Agent, or Firm* — Wolfe-SBMC

(57) ABSTRACT

A method and system of delivering a Multimedia Messaging Service (MMS) message is disclosed. In one example, the method includes providing a storage location and time duration for outside content to be indirectly referenced by an MMS message. Receiving and storing the outside content via a transport network is also disclosed. The method may include encapsulating an MMS message in a payload of a transport message with the MMS message indirectly referencing the storage location of the outside content. Delivery of the transport message may occur over a transport network. Confirming receipt of the transport message is also disclosed.

26 Claims, 3 Drawing Sheets

(56) References Cited

OTHER PUBLICATIONS

"Non-Final Office Action", U.S. Appl. No. 10/964,911, Feb. 21, 2008, 7 pages.

"Notice of Allowance", U.S. Appl. No. 10/964,911, Feb. 3, 2011, 6 pages.

"Restriction Requirement", U.S. Appl. No. 10/964,911, Dec. 31, 2007, 4 pages.

* cited by examiner

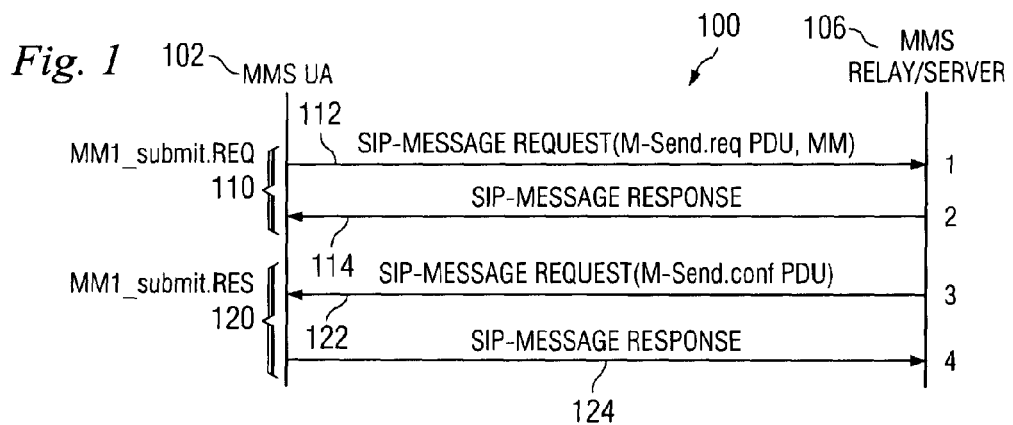
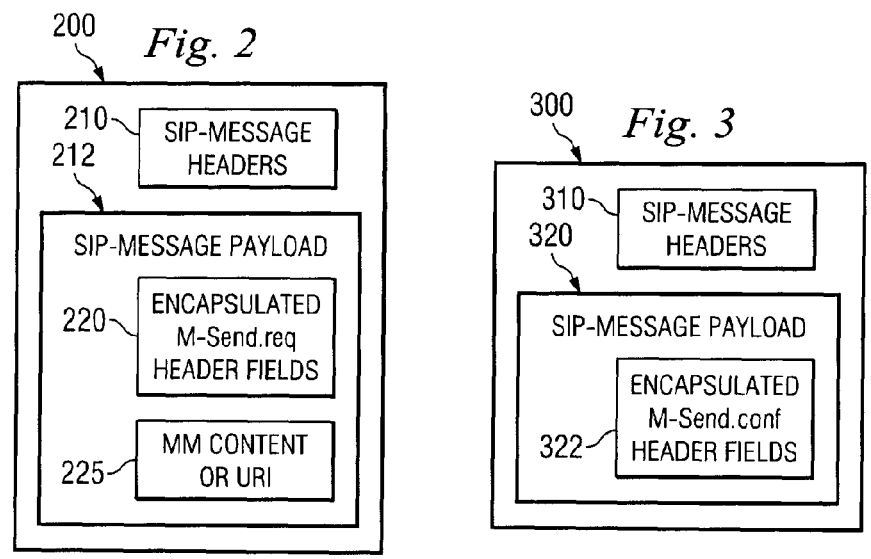
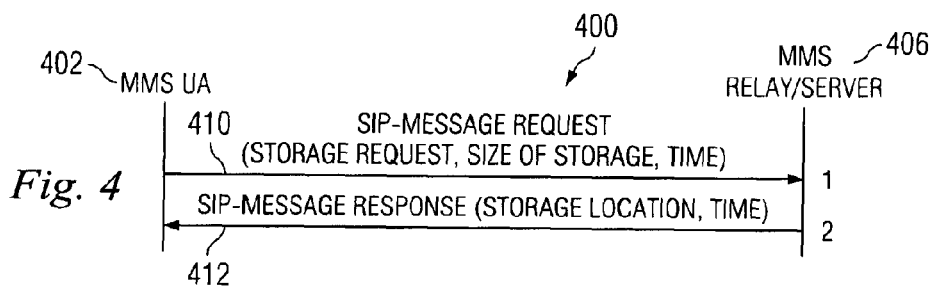
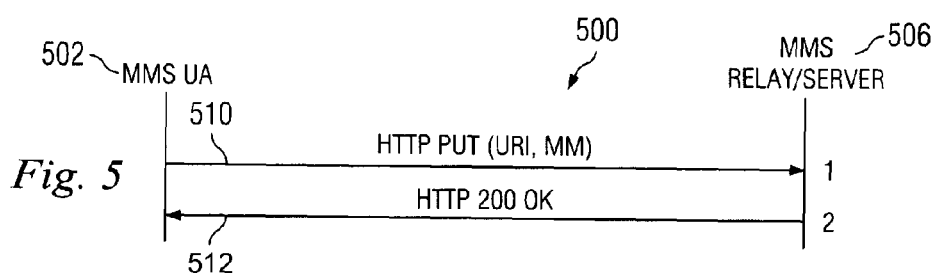

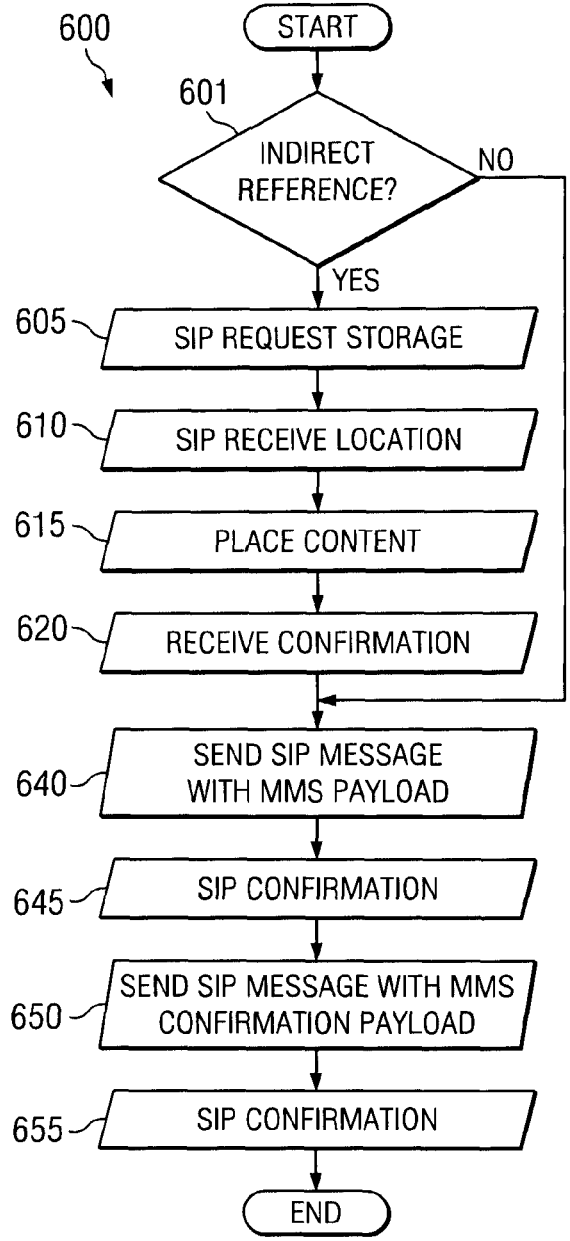

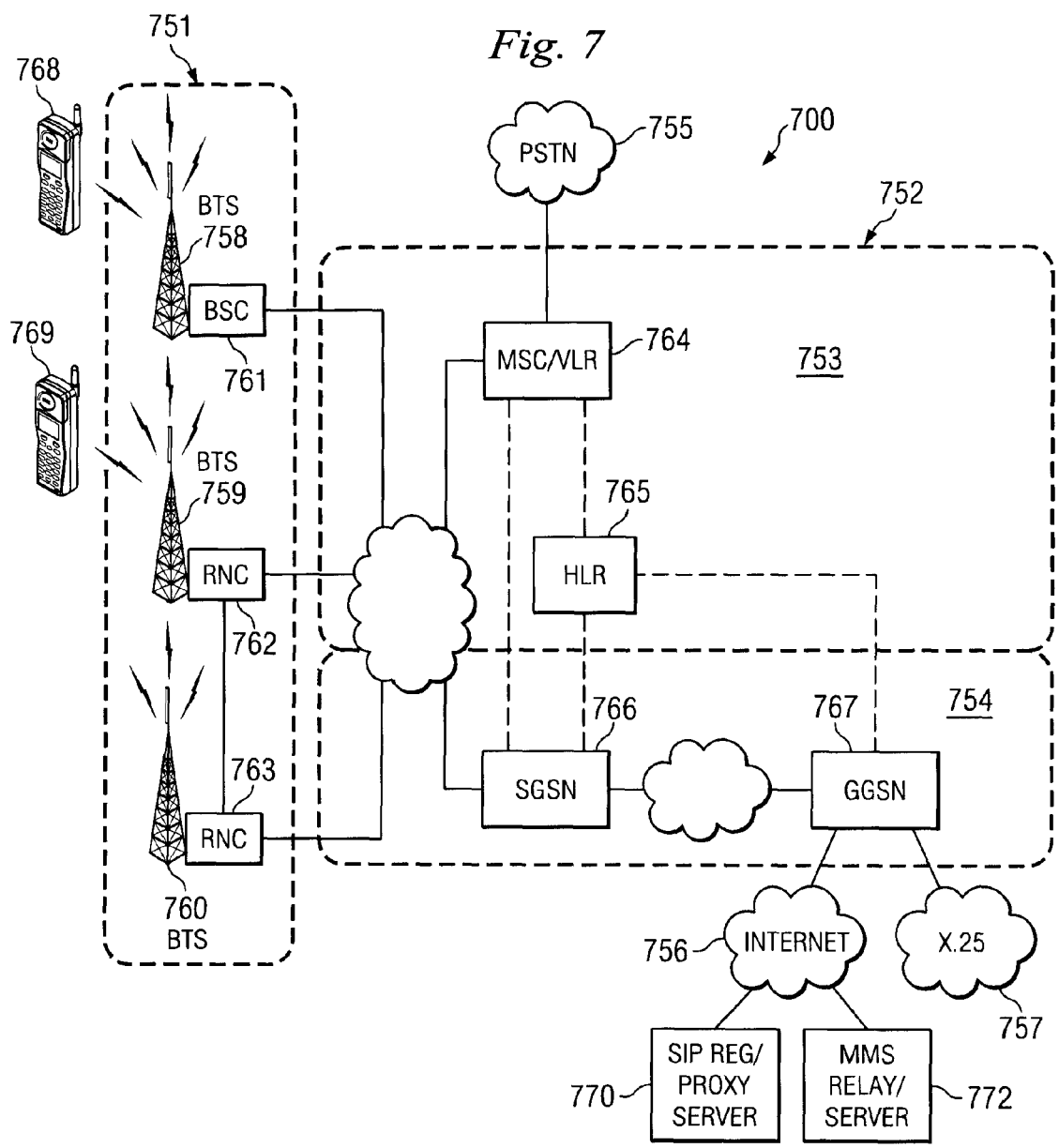

METHOD AND SYSTEM FOR MULTIMEDIA MESSAGE DELIVERY IN A COMMUNICATION SYSTEM

CROSS REFERENCE

This application is a Continuation application of U.S. patent application Ser. No. 10/964,911 filed on Oct. 13, 2004, titled "Method and System or Multimedia Message Delivery in a Communication System," which claims the benefit of U.S. Provisional Patent Application Ser. No. 60/510,654 filed Oct. 13, 2003, the disclosures of each of which is hereby incorporated by reference in its entirety. This application is related to U.S. patent application Ser. No. 10/920,850, filed on Aug. 18, 2004, which is hereby incorporated by reference in its entirety.

BACKGROUND

Data transfer, including wireless and wireline messaging, is a service that has become increasingly important to subscribers. Existing service providers, such as providers of wireless and wireline voice services, as well as companies catering specifically to wireless data needs, provide data services and plans. Some subscribers may obtain a data package that is part of a total package that may include wireless voice services and other services. Other subscribers, for example those using a personal digital assistant (PDA) that is not equipped to accept voice calls, may require only wireless data services.

Existing networks allow users of devices such as wireless phones, two way pagers, and computers to exchange simple text based messages with other subscribers and, in some cases, with users who may not be a part of the same network or who may only have access to traditionally land-based services such as email. The complexity of the type of messages being sent, as well as the content of the messages, has increased as the sophistication of the networks has increased. For example, newer wireless and wireline networks generally provide support for the exchange of photographs and multimedia presentations between wireless users and between wireless users and wireline users.

Networking and wireless standards have been developed to provide functionality for multimedia capable devices and to allow interaction between the new devices and legacy devices and systems. For example, application servers have been introduced into networks under the 3GPP2 and 3GPP standards, such as internet protocol (IP) multimedia subsystem (IMS) based networks, to support multimedia applications and communications. However, despite these developments, existing standards and technologies have failed to adequately address all of the technology needs brought on by the data transfer requirements of the multimedia capable devices.

SUMMARY

In one embodiment, the present disclosure introduces a method for communicating using a Multimedia Messaging Service (MMS) over a Session Initiated Protocol (SIP) based network. The method includes receiving a first SIP message request over the SIP based network, and sending a first SIP message response over the SIP based network. The method also includes processing a message payload of the first SIP message request. The message payload may contain MMS content. The method may also include determining that the message payload contains a universal resource indicator (URI) which provides an indirect reference to content outside the SIP message. The method may include accessing the outside content from a predetermined location indicated by the URI.

In another embodiment, the present disclosure introduces a method of delivering an MMS message that includes providing a storage location and duration for outside content to be indirectly referenced by an MMS message. The outside content may be received from a transport network and stored. An MMS message may be encapsulated in a payload of a transport message, and the MMS message may indirectly reference the storage location of the outside content. The transport message may be delivered over the transport network and confirmation of receipt of the transport message may be sent.

An embodiment of a system for delivery of MMS message is also disclosed. The system may comprise a user agent configured to send and receive Multipurpose Internet Mail Extension (MIME) encoded MMS messages over a transport network in a payload of a transport message. The system may also include an MMS Relay/Server configured to send and receive MIME encoded MMS messages over the transport network in a payload of a transport message. The user agent and the MMS Relay/Server may each be configured to provide a confirmation of receipt of a transport message. The MMS Relay/Server may also be configured to provide a storage location for content indirectly referenced by an MMS message that is encapsulated in a transport message when the MMS message is greater than a predetermined size.

The foregoing has outlined features of several embodiments so that those skilled in the art may better understand the detailed description that follows. Additional features will be described below that may further form the subject of the claims herein. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure.

BRIEF DESCRIPTION OF THE DRAWINGS

FIG. 1 is a message flow chart corresponding to one embodiment of a method of transporting Multimedia Messaging Service (MMS) messages over a Session Initiation Protocol (SIP) based network.

FIG. 2 is a block diagram of one embodiment of an SIP message with an MMS message payload.

FIG. 3 is a block diagram of another embodiment of an SIP message with an MMS message payload.

FIG. 4 is a message flow chart corresponding to a method for determining a storage location for content indirectly referenced in an MMS message.

FIG. 5 is a message flow chart corresponding to a method for placing multimedia content onto an MMS Relay/Server.

FIG. 6 is a flow chart illustrating another embodiment of a method for transporting MMS messages on an SIP based network.

FIG. 7 illustrates a block diagram of one embodiment of a wireless network within which aspects of the present disclosure may be implemented.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure is related to, and hereby incorporates, MMS MM1 Stage 3 Using SIP, available at http://www.3gpp2.org/Public_html/specs/ under the document name X.S0016-312-0 v1.0. However, it is understood that the present disclosure may be applied to any application server (AS) operating in an Internet protocol (IP) multimedia subsystem (IMS) network as defined, for example, under the 3GPP and 3GPP2 standards. For purposes of illustration, the present disclosure frequently uses the Multimedia Messaging Service (MMS) standard as a particular example of a Session Initiation Protocol (SIP) AS, but it is understood that the disclosure is not limited to MMS and may be applied to other SIP application servers, as well as other IMS application servers. Furthermore, as SIP may be used to provide a transport layer-independent way to exchange data and provide other services, such as voice or phone services, the present disclosure is equally applicable to both wireless and wireline services. Accordingly, while SIP and MMS specific messages and message sequences are described in the following examples, it is understood that they may be replaced by other messages and message sequences for implementations involving other technologies.

Referring to FIG. 1, a message flow chart corresponding to one embodiment of a method of transporting Multimedia Messaging Service (MMS) messages over a Session Initiation Protocol (SIP) network is illustrated. A Multimedia Messaging Service (MMS) User Agent (UA) 102 is shown in communication with an MMS Relay/Server 106. It is understood that the MMS UA 102 may not be in direct communication with the MMS Relay/Server 106, as other network components may interpose the MMS UA 102 and the MMS Relay/Server 106.

The MMS UA 102 (which may be viewed as an MMS implementation of an Application User Agent (AUA) for any wireless or wireline IMS user) enables a wireless user to access MMS services. The MMS UA 102 may be implemented by hardware, software, firmware, or another suitable medium and may reside on a wireless mobile device. A wireless mobile device may include a mobile phone or other wireless enabled devices, such as a Personal Digital Assistant (PDA), a personal computer, an automobile, or a two-way paging device, for example. Other devices on which an MMS UA 102 may reside include workstations, servers, a network node, or other network, computer, or telecommunications systems or components. In some embodiments, the MMS UA 102 may communicate directly with the MMS Relay/Server 106. In some embodiments, for example where the MMS UA 102 resides on a wireless mobile device, there may be interposing structures and equipment, as explained in greater detail below.

The MMS UA 102 may communicate with the MMS Relay/Server 106 via a transport network. The transport network may include all or portions of wireless or wireline phone networks, distributed networks such as the Internet, wide area networks (WANs), local area networks (LANs), and/or other communications networks. In one embodiment, the MMS UA 102 and the MMS Relay/Server 106 communicate over an SIP-based network In some embodiments, there may be additional SIP devices or nodes associated with the SIP Relay/Server 106, such as an SIP registrar (not shown), an SIP proxy server (not shown), or an SIP redirect server (not shown). The SIP network itself may implemented independently of the transport layer, which may be based on Internet Protocol (IP), User Datagram Protocol (UDP), Transmission Control Protocol (TCP), and/or other standards. The SIP-based network may be implemented as a public network (e.g., the Internet), as a private network (e.g., an intranet), or as a combination of public and private networks.

The MMS Relay/Server 106 may provide multimedia messaging services to the MMS UA 102. In some embodiments, an SIP Proxy (not shown) may serve to relay information from the MMS Relay/Server 106 to the MMS UA 102. The MMS Relay/Server 106 may either act as a server and route MMS messages from one MMS UA to another, or may act as a relay, possibly in communication with other MMS Relay/Servers, to provide messaging or other services over an SIP based network.

In operation, a multimedia message may be sent via one or more SIP messages as shown by the MM1_submit.REQ label 110 of FIG. 1. An SIP message request 112 may be sent from the MMS UA 102 to the MMS Relay/Server 106 over the SIP network. The SIP message request 112 may contain an embedded or encapsulated MMS message as will be described in greater detail below. Upon receiving the SIP message request 112, the MMS Relay/Server 106 may confirm receipt of the SIP message request 112 by sending an SIP message response 114 back to the MMS UA 102. The response 114 may be an SIP "200 OK" message, for example. A confirmation of receipt of the MMS message, shown by MM1_submit.RES label 120, may be sent from the MMS Relay/Server to the MMS UA 102 through another series of SIP messages. An SIP message request 122 containing the MMS confirmation may be sent to the MMS UA 102 from the MMS Relay/Server 106, followed by an SIP response 124 from the MMS UA 102 to the MMS Relay/Server 106. As before, the SIP response 124 may be an SIP "200 OK" response or other suitable SIP response.

Referring to FIG. 2, a block diagram of one embodiment of an SIP message 200 with an MMS message payload is shown. The SIP message 200 is one embodiment of message 112 of FIG. 1. The SIP message 200 may contain an SIP header 210. The SIP message may also contain a payload 212, which may encapsulate the MMS data. The payload 212 may be encoded in Multipurpose Internet Mail Extension (MIME) multipart/related format, or another suitable format. Additionally, the payload may contain multiple parts. For example, the MMS content or payload 212 may have a header field 220 and a data field 225. The header field 220 may specify information concerning the encapsulated MMS message, such as the content type. More information concerning the MMS format may be found in the document, OMA-WAP-ENC-V1.1 Multimedia Messaging Service; Encapsulation Protocol, available at http://www.openmobilealliance.org/, which is hereby incorporated by reference.

As denoted by block 225 of FIG. 2, the payload 212 may also contain the actual content of the MMS message 225 or an indirect reference to the content, which may be located elsewhere on the network. When the MMS message 212 is processed by the MMS Relay/Server 106, the reference to the MMS content may be through the use of a Uniform Resource Indicator (URI) or by other suitable means. Allocation of a URI for MMS content by the MMS Relay/Server 106 will be described in greater detail below.

Referring to FIG. 3, a block diagram of another embodiment of an SIP message 300 with an MMS message payload is illustrated. The SIP message 300 illustrates one embodiment of the SIP message request 122 of FIG. 1. The SIP message 300 may contain an SIP header 310, as before. The payload of the SIP message 300 may be an encapsulated MMS message 322, which may be encoded in MIME or another format. The actual content 322 of the MMS message may be an MMS message confirmation. This confirmation could be in response to the MMS message 212 of FIG. 2, which may be the payload of the original SIP message request 112 of FIG. 1.

Referring to FIG. 4, a message flow chart 400 corresponding to a method for determining a storage location for content indirectly referenced in an MMS message is illustrated. As stated previously, an MMS message may indirectly reference message content via a URI or other addressing method. The methods shown in FIGS. 4-5 for requesting storage and placing content, respectively, may need to be performed before the procedure for sending an MMS message (as shown in FIG. 1) to ensure that the referenced MMS content is available at the MMS Relay/Server. The maximum size of the MMS message itself (without indirect referencing) may be limited by the provider of the transport network or other constraints. For example, the maximum size of an MMS message may be 1300 bytes.

In a case where the MMS message provides an indirect reference, the MMS UA 402, which may be similar to the MMS UA 102 of FIG. 1, may send an SIP message request 410 to the MMS Relay/Server 406, which may be similar to the MMS Relay/Server 106 of FIG. 1. The SIP message request 410 may request a particular storage size and minimum length of time that the storage location is reserved for the MMS content for example. The MMS Relay/Server 406 may respond to the MMS UA 102 by an SIP response message 412, which may indicate a storage location for the MMS content and the minimum amount of time reserved for storage.

Referring to FIG. 5, a message flow chart corresponding to a method 500 for placing multimedia content onto an MMS Relay/Server is shown. The MMS UA 502 and the MMS Relay/Server 506 may be similar to those already described. The method 500 of placing MMS content may be used in conjunction with the method 400 of FIG. 4 for determining a storage location for MMS content. Following the determination of a storage location for the indirectly referenced content, the MMS UA 502 may send the content to the MMS Relay/Server 506 via Hypertext Transfer Protocol (HTTP) or another method or protocol. An HTTP "PUT" command 510 may issue from the MMS UA 502 to the MMS Relay/Server 506 specifying the storage location for the content (from the request shown in FIG. 4) and may provide the actual content. The MMS Relay/Server 506 may reply with an HTTP "200 (OK)" response 512. Following this procedure, MMS content that is indirectly referenced by an MMS message may be accessible on the same MMS Relay/Server as the received MMS message.

In one embodiment of the present disclosure, when the MMS content has been placed on the MMS Relay/Server, the content may be indirectly referenced by URIs in multiple MMS messages. The MMS content may only be accessible to MMS messages or applications residing on the same MMS Relay/Server as the originally-received MMS message. In other embodiments, the MMS content may be passed to other SIP based applications residing in different locations by passing the URI. For example, a SIP based application operated by a first service provider may be able to access message content stored by a second service provider by using the URI referring to a storage location of the message content.

Referring to FIG. 6, a flow chart 600 illustrating one embodiment of a method for transporting MMS messages on an SIP based network is shown. If the MMS message to be sent will have an indirect reference to MMS content as determined in step 601, a storage location is requested for the content at step 605. When the storage location is received at step 610, the content is placed on the MMS Relay/Server at step 615 and placement is confirmed at step 620. The procedure for determining a storage location and placing the content (steps 605, 610, 615, and 620) was previously described in detail with regard to FIGS. 4-5.

If no indirect reference in the MMS message is needed (as determined in step 601), or following the confirmation of placement of the content at step 620, a SIP message is sent at step 640 that encapsulates the MMS message as previously described. When the SIP message of step 640 is confirmed at step 645, an SIP message containing an MMS confirmation may be sent back to the original sender at step 650. Finally, the SIP message of step 650 may be confirmed at step 655. The process of sending the MMS message encapsulated in an SIP message (steps 640, 645, 650, 655) was previously described in detail with regard to FIG. 1.

FIG. 7 illustrates a block diagram of a telecommunications network 700 that provides an exemplary system within which the methods disclosed herein may be practiced. In the present example, the network 700 is a wireless network that supports both voice and data packet communications using General Packet Service Radio (GPRS) and Universal Mobile Telecommunications System (UMTS) technologies.

The network 700 comprises a Radio Access Network (RAN) 751 and a core network 752. The core network further comprises a circuit domain 753 and a packet domain 754. Other networks may be accessible to the network 700, such as a Public Switch Telephone Network (PSTN) 755 (connected to the circuit domain 753) and Internet 756.

The RAN 751 includes a plurality of cells (not shown) serviced by base transceiver stations (BTS) 758, 759, and 760. The BTS 758 is connected to a base station controller (BSC) 761 to provide a second-generation wireless network. The BTSs 759, 760 are accessible to radio network controllers (RNC) 762, 763, respectively, to provide a third-generation wireless network. A mobile switching center/visitor location register (MSC/VLR) 764 may be used to connect the core network 753 with other networks, such as the PSTN 755. A home location register (HLR) 765 may be accessible to the MSC/VLR 764 and also to a serving GPRS support node (SGSN) 766 and a gateway GPRS support node (GGSN) 767 in the packet domain 754.

The network 700 enables at least one mobile device 768 to establish a communication session with another device via the BTS 758. An MMS UA, as previously described, may reside on the mobile device 768. A request to establish a communication session by the mobile device 768 may be directed by the MSC/VLR 764 to (1) a second mobile device 769, (2) a voice terminal (not shown) coupled to the PSTN 755, or (3) a data terminal (not shown) coupled elsewhere to the telecommunications network 700. For example, if the communication session is a circuit data transfer session, the request may be to connect the mobile device 768 to a computer or other data device via the network 700. If the communication is a packet data transfer session, the request may be routed through the SGSN 766, the GGSN 767, and to the Internet 756. An SIP based network may interface with the SGSN 766 and/or the GGSN 767. It is noted that the mobile devices 768 and 769, while illustrated as mobile telephones, may be any mobile device capable of communicating via the network 700.

An SIP Registrar/SIP Proxy 770 may be connected to the Internet 756 and may utilize the Internet 756 using SIP over an IP transport layer. Similarly, an MMS Relay/Server 772 may be connected to the Internet 756 using SIP with the Internet 756 as the IP transport layer. The SIP Registrar/SIP Proxy 770 and the MMS Relay/Server 772 may operate both with one another, and with the MMS UA residing on the mobile device 768. It is understood that the network 700 is for purposes of illustration and the present disclosure may be equally applicable to other networks, including code division multiple access (CDMA), time division multiple access (TDMA) networks, and third generation wireless networks using SIP for both data and voice channels.

Those skilled in the art should appreciate that they may readily use the present disclosure as a basis for designing or modifying other processes and structures for carrying out the same purposes and/or achieving the same advantages of the embodiments introduced herein. For example, various steps of the described methods and sequences may be executed in a different order or executed sequentially, combined, further divided, replaced with alternate steps, or removed entirely. In addition, various functions illustrated in the methods or described elsewhere in the disclosure may be combined to provide additional and/or alternate functions. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of operating a user agent (UA) to store Multimedia Messaging Service (MMS) content on a MMS relay/server, the method comprising:
   requesting, by the UA through a multimedia message, a storage location on the MMS relay/server, wherein no storage location on the MMS relay/server is allocated to the UA until the requesting;
   receiving, by the UA from the MMS relay/server, a response indicating a storage location on the MMS relay/server;
   sending, by the UA to the MMS relay/server, content to be stored at the storage location.

2. The method of claim 1, wherein requesting, by a UA, a storage location on the MMS relay/server comprises requesting a particular storage size.

3. The method of claim 1, wherein requesting, by a UA, a storage location on the MMS relay/server comprises requesting a length of time that the storage location is to be reserved.

4. The method of claim 1, wherein, receiving, by the UA from the MMS relay/server, a response indicating the storage location comprises receiving a response indicating a universal resource indicator (URI) associated with the storage location.

5. The method of claim 1, further comprising:
   encapsulating, by the UA, the content in a payload of a transport message, and
   sending, by the UA, the transport message to the MMS relay/server over a transport network.

6. The method of claim 5, wherein the transport network is a Hypertext Transfer Protocol (HTTP) based network.

7. The method of claim 5, wherein the transport network is a Session Initiated Protocol (SIP) based network.

8. The method of claim 5, wherein the transport network comprises at least a portion of a mobile telephone network.

9. A method of operating a MMS relay/server to store Multimedia Messaging Service (MMS) content on a MMS relay/server comprising:
   receiving, by a MMS relay/server, a multimedia message request from a user agent (UA) to reserve a storage location on the MMS relay/server, wherein no storage location on the MMS relay/server has been allocated to the UA before the MMS relay/server receives the request from the UA;
   identifying, by the MMS relay/server, a storage location;
   sending, by the MMS relay/server, a response to the UA indicating the storage location;
   receiving, by the MMS relay/server, content from the UA; and
   storing, by the MMS relay/server, the content from the UA at the identified storage location.

10. The method of claim 9, wherein sending, by the MMS relay/server, a response to the UA indicating the storage location comprises sending a response indicating a size of a storage location storage size.

11. The method of claim 9, wherein sending, by the MMS relay/server, a response to the UA indicating the storage location comprises sending a response indicating a length of time that a storage location is reserved for content storage.

12. The method of claim 9, wherein sending, by the MMS relay/server, a response to the UA indicating the storage location further includes providing a universal resource indicator (URI) associated with the storage location.

13. The method of claim 9, wherein receiving, by the MMS relay/server, content from the UA comprises receiving content encapsulated in a payload of a transport message.

14. A user agent (UA) configured to store Multimedia Messaging Service (MMS) content on a MMS relay/server, the UA comprising:
   a transmitter configured to send a multimedia message request for a storage location to the MMS relay/server; and
   a receiver configured to receive from the MMS relay/server, a response indicating a storage location on the MMS relay/server;
   the transmitter being further configured to send to the MMS relay/server, content to be stored at the storage location;
   wherein no storage location has been reserved on the MMS relay/server for the UA at a time the request is made.

15. The UA of claim 14, wherein the transmitter is configured to request a storage location having a particular storage size.

16. The UA of claim 14, wherein the transmitter is configured to request a length of time that the storage location is to be reserved.

17. The UA of claim 14, wherein, the receiver is configured to receive a response indicating a universal resource indicator (URI) associated with the storage location.

18. The UA of claim 14, further comprising:
   an encapsulator configured to encapsulate the content in a payload of a transport message.

19. The UA of claim 14, wherein the transmitter is configured to send the content over a Hypertext Transfer Protocol (HTTP) based transport network.

20. The UA of claim 14, wherein the transmitter is configured to send the content over a Session Initiated Protocol (SIP) based transport network.

21. The UA of claim 14, wherein the transmitter is configured to send the content over at least a portion of a mobile telephone network.

22. A Multimedia messaging Service (MMS) relay/server configured to store Multimedia Messaging Service (MMS) content, comprising:

a receiver configured to receive a multimedia message request from a user agent (UA) to reserve a storage location on the MMS relay/server, wherein the MMS relay/server has not reserved a portion of itself as storage location for the UA when the request is first received;

a processor configured to identify a storage location;

a transmitter configured to send a response to the UA indicating the storage location;

the receiver being configured to receive content from the UA; and the processor being configured to store the content from the UA at the identified storage location.

23. The MMS relay/server of claim 22, wherein the transmitter is configured to send a response indicating a size of a storage location storage size.

24. The MMS relay/server of claim 22, wherein the transmitter is configured to send a response to the UA indicating a length of time that a storage location is reserved.

25. The MMS relay/server of claim 22, wherein the transmitter is configured to send a universal resource indicator (URI) associated with the storage location to the UA.

26. The MMS relay/server of claim 22, wherein receiver is configured to receive content encapsulated in a payload of a transport message.

* * * * *